United States Patent [19]
Gernelle

[11] 3,974,480

[45] Aug. 10, 1976

[54] DATA PROCESSING SYSTEM, SPECIALLY FOR REAL-TIME APPLICATIONS

[76] Inventor: François Gernelle, 18 avenue du Bois, 92290-Chatenay Malabry, France

[22] Filed: May 8, 1974

[21] Appl. No.: 468,299

[52] U.S. Cl. .................. 340/172.5; 235/153 AK
[51] Int. Cl.² ................................. G06F 11/04
[58] Field of Search ........... 235/153 AK; 340/172.5

[56] References Cited
UNITED STATES PATENTS

| | | | |
|---|---|---|---|
| 3,286,239 | 11/1966 | Thompson et al. | 340/172.5 |
| 3,568,158 | 3/1971 | Haller et al. | 340/172.5 |
| 3,639,911 | 1/1972 | Frieband et al. | 340/172.5 |
| 3,688,263 | 8/1972 | Balogh et al. | 340/172.5 |
| 3,699,532 | 10/1972 | Schaffer et al. | 340/172.5 |
| 3,725,868 | 4/1973 | Malmer, Jr. et al. | 340/172.5 |
| 3,757,307 | 9/1973 | Cosserat et al. | 340/172.5 |
| 3,805,038 | 4/1974 | Buedel et al. | 235/153 AK |
| 3,838,260 | 9/1974 | Nelson | 235/153 AK |
| 3,838,261 | 9/1974 | Rice et al. | 235/153 AK |

*Primary Examiner*—Charles E. Atkinson

[57] ABSTRACT

This invention relates to a data processing system, specially for real-time applications. This system comprises a processor having a relatively small number of registers, and safeguard storages consisting each of a stack of sequentially addressable registers. When a program being performed is interrupted, all the information contents of the processor registers are transferred to at least one safeguard storage. The transferred information are subsequently extracted, upon resumption of the interrupted program, from the safeguard storage, in a sequential order reverse with respect to the order in which they had been previously transferred. This system is specially adapted for controlling industrial processes.

6 Claims, 2 Drawing Figures

DATA PROCESSING SYSTEM, SPECIALLY FOR REAL-TIME APPLICATIONS

FIELD OF THE INVENTION

The present invention relates to data-processing systems, and in particular to such systems which are intended for real-time applications requiring a relatively low processing capability.

Typical real-time applications as contemplated for the data processing system according to this invention may include, inter alia: controlling industrial processes, instrumentation, scientific computations, teletransmission, the distribution of television programs, education and professional training, and some real-time managements or administrations, such as the real-time management of stocks.

DESCRIPTION OF THE PRIOR ART

The data processing system according to the present invention was developed mainly for filling a gap existing till now in the means available for controlling industrial processes. At present, these means are of a first and a second type The first type comprises computers of moderate size, usually referred to as mini-computers, which are nevertheless very expensive and must therefore be restricted to use for the control of complex industrial plants. Moreover, these mini-computers are poorly adapted for this function, which requires dealing wih a considerable number of inputs and outputs, but processing only operations which are relatively simple and infrequent. Yet, a mini-computer operated for controlling an industrial plant is literally overwhelmed due to the priority assigned to input and output processing, so that only very short operating time is left for performing the other necessary processing operations; under these conditions, it is clear that such mini-computers are ill suited for such applications.

For controlling simpler industrial plants the use of mini-computers was abandoned in favor of a second type of automatic devices, comprising electromagnetic relays or equivalent logic components. However, it is obvious that such automatic devices are objectionable on account of a very restricted versatility, since they comprise but read-only memories, so that their program cannot be modified during operation.

Finally, there is a wide range of medium-sized industrial plants, for the control of which using a minicomputer would be too expensive, whereas a highly sophisticated and poorly reliable automatic device would be required.

SUMMARY OF THE INVENTION

A primary object of this invention is to provide a data processing system having a relatively low processing capability, and, consequently, reduced manufacturing and operating costs, so that said system is particularly well suited for controlling mean-sized industrial plants. Due to its moderate cost, said system may also be used advantageously for controlling the simplest industrial plants, as a substitute for automatic devices used up to now, over which it has the important advantage of affording a higher control flexibility inasmuch as, like every data processing system, it is controlled by an easily modifiable program. Moreover, since said system has a modular structure which permits increase of its processing capability at will, it can be also used for controlling the largest industrial plants, as a substitute for the mini-computers used up to now to this end, with further advantages to be depicted hereinafter.

A second object of this invention is to provide a data processing system for real-time applications, said system comprising means for producing successive program interrupts, which permits the performance of a predetermined sequence of subprograms as requested for the contemplated real-time application, and, upon completion of one subprogram, means for resuming the previously interrupted program or subprogram exactly at the point where it was interrupted.

Another object of this invention is to provide a data processing system comprising a processor having a relatively small number of registers, abour a half-score or so, said processor being connected through at least one bus line to one and preferably a plurality of safeguard storages consisting each of a stack of a number N of independent, sequentially adressable registers, means for transferring the contents of all the registers of said processor to one or a plurality of said safeguard storages in a predetermined sequential order when a program or subprogram is interrupted, and means for re-charging the registers of said processor by extracting the information from the safeguard storages in the sequential order when the previously interrupted program or sub-program is resumed opposite to said predetermined sequential order.

With the mini-computers used for real-time applications of the type mentioned hereinabove, when a program or subprogram is interrupted, only the contents of some of the processor registers can be transferred to random access live storages, since these transfers and the reverse transfers, when resuming the previously interrupted program or subprogram, require that some registers of the processor are charged with the addresses of the transfer areas in said live storages. In contrast thereto, with the system of this invention, it is possible to transfer the contents of all the registers of the processor to the safeguard storages, since no one of the processor registers is required for storing the adresses of said safeguard storages; this results from each safeguard storage consisting of a stack of independent registers, which are sequentially addressable, so that their respective addresses are not to be stored in the processor. Under these conditions, it is clear that featuring the system according to this invention, a processor having a small number of registers is permitted by the use of safeguard storages of said specific type; in addition, since the applications contemplated for the data processing system according to this invention only require a relatively moderate processing capability its processor can be embodied with a small number of large scale integrated circuits, so that it can be manufactured at a very low cost, considerably lower than that of known mini-computers.

The use of special safeguard storages in the system according to this invention does not result in any undesired increase of the total cost of the system, since on the one hand savings are made on the safeguard storage areas which, otherwise, would have to be provided for in live storages, and on the other hand these special safeguard storages, consisting each of a stack of separate, sequentially addressable registers, are particularly simple, reliable and economical.

Still another object of this invention is to provide a data processing system of the type previously indicated, wherein the incidence of the special safeguard storages on the total cost of the system is further reduced in inserting at least some of its safeguard storages, under time-sharing conditions, in channels adapted for the exchange of information between the processor and rapid peripheral units, according to a copending U.S. Pat. application Ser. No. 468,298 filed by the Applicant on May 8, 1974 for a "Channel for exchanging information between a computer and rapid peripheral units", since this time-sharing use of said safeguard storages increases strongly the duty factor of said storages. Moreover, the processor is thereby relieved almost completely of the input and output processing concerning the rapid peripheral units, which is particularly time-consuming, as already mentioned in the foregoing, in the case of mini-computers used for controlling industrial processes. Consequently, the data processing system according to this invention is much better suited than hitherto known mini-computers for controlling industrial processes, inasmuch at its relatively moderate processing capability is utilized under substantially full-time conditions for the process control operations, since the processing of the peripheral units, and in particularly of the rapid peripheral units, which is the most time-consuming, requires only sporadic control operations from the processor, as described in detail in said copending patent application.

A further object of this invention is to provide a data processing system of the type previously indicated, wherein at least some of the safeguard storages are also used under time-sharing conditions as temporary storages for storing intermediate processing results, subprogram parameters, etc.; in addition to thereby increasing the duty factor of the special safeguard storages and to thereby reducing the total cost of the system, this feature results in further savings being obtained as a consequence of the possible reduction in the capacity of the live storages to be provided for the temporary storing of intermediate processing results and of subprogram parameters.

A still further object of this invention is to provide a data processing system of the type previously indicated, wherein read-only storages for storing program and subprogram instructions and live storages for storing program and subprogram parameters are connected to the bus line. The last-mentioned feature facilitates greatly the use of the system according to this invention and makes it accessible even to unskilled personnel, which is particularly advantageous for many industrial applications; in fact, the possibility of modifying the program and subprogram parameters, for example by setting adjustment members on the system control board (which is within the capability of any operator even if not conversant with information processing) imparts to the system according to this invention a versatility amply sufficient for the industrial applications contemplated herein, since the instructions stored in read-only storages can easily be modified each time the controlled industrial plant or installation is stopped for any reason; in contradistinction thereto, the versatility of all the automatic devices which were heretofore used for small plants, was incomparably lower than that of the system according to this invention, whereas minicomputers require highly skilled personnel for programming them.

BRIEF DESCRIPTION OF THE DRAWING

By way of example, a typical embodiment of the data processing system according to this invention will now be described with reference to the attached drawing, in which.

DESCRIPTION OF THE PREFERRED EMBODIMENT

Figure 1:
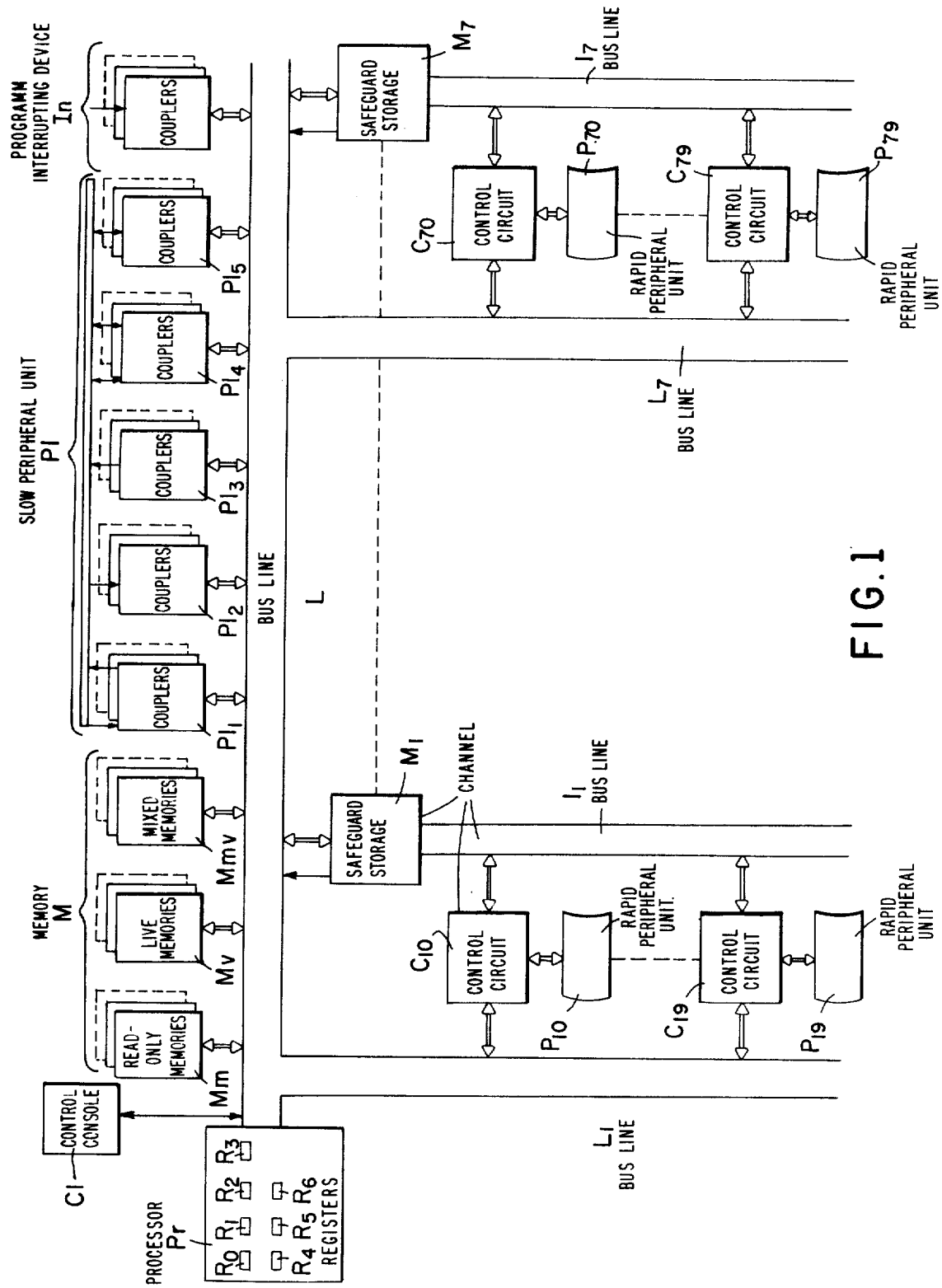
FIG. 1 is a block diagram of the data processing system.

The data processing system according to this invention, of which the general diagram is illustrated in FIG. 1, has a modular structure, whereby its capacities can be adapted without any difficulty to the magnitude of the industrial equipment or plant to be controlled thereby; it may also be used without requiring major changes for any other real-time applications, notably those mentioned or suggested in the foregoing.

Its processor Pr is characterised essentially in that it comprises but a small number of registers, notably seven registers $R_0$ to $R_6$; of course, it incorporates all the necessary circuits for performing the various processing operations contemplated in a data processing system of this type, i.e., logic operations, mathematical operations, and the like, together with an instruction counter. Obviously, a detailed description of these various circuits is not necessary, since different known arrangements thereof are well known to those conversant with the art; it is only sufficient to point out that the small number of registers and the low processing capability contemplated for the processor Pr made it possible to construct this processor in a considerably more compact form than that of processors equipping hitherto known mini-computers, due notably to the use, as a basic component of such processor, of a circuit characterized by a very large integration scale, of the MOS type, such as the integrated circuit of the type LSI 8008 sold by the INTEL Company. Of course, the large scale of integration thus obtained affords a substantial reduction in the final cost of the processor Pr. By virtue of this extreme miniaturization it was thus possible to assemble all the circuits of processor Pr on a common card and to fit as a complement, on the same card, the special clock necessary for real-time applications, as well as all the means required, as far as the processor is concerned, for obtaining eight stepped or graded levels of interruption of the program or sub-program being performed, and even a device for starting the data processing system automatically; these various component elements are also known per se and therefore do not require a detailed description herein, but their incorporation in a single and common processor card constitutes one of the advantages characterizing the system according to the present invention compared with the known mini-computers used up to now for the same applications.

The processor Pr is adapted to exchange information with the other units of the data processing system proper, and also with the peripheral units connected thereto, in a manner known per se, via at least one bus line L. In FIG. 1 it will be seen that this bus line L has connected thereto, in parallel, the data processing system control console Cl, a storage unit or memory M, a set of slow peripheral units Pl, the program interrupting device In, together with one or a plurality of safeguard storages such as $M_1, M_2 \ldots M_7$. The connections between the bus line L and these various elements are shown diagrammatically in FIG. 1 in the form of two-point arrows, this indicating that the exchange of information can take place in both directions through these connections. It is pointed out that the same applies to bus line L, which is intended only for the bidirectional exchange of information between processor Pr and anyone of the above-listed other units of the data processing system; it may be emphasized that these information exchanges are not influenced in any manner by the distribution of the various connections along the bus line L, since this distribution in space was used in FIG. 1 only with a view to make it clearer, without any physical meaning. In fact, this bus line, in the data processing system according to this invention, is embodied as a single printed circuit providing the necessary connections between the processor Pr and the other units of the data processing system, without any wiring. A plurality of cards each carrying such a printed circuit, corresponding in fact to a bus line, may be provided for in the embodiments of the data processing system of this invention which have a greater capacity.

According to the present invention, all the conductors of said bus line L lead to each connector of said line, to which the various units Cl, Mm, Mmv, $Pl_1$ to $Pl_5$, $M_1$ to $M_7$ of the data processing system are connected, and all these connectors are identical with each other, so that anyone of the above-mentioned units of the data processing system can be connected to any of them; this standardization of the connectors of said bus line L ensures a perfect modular structure of the data processing system according to this invention, while facilitating its flexible adaptation to the specific application contemplated.

In the embodiment of the invention contemplated herein, the set of storages M has a total capacity of 16 kilo-octets, with direct addressing; this assembly comprises:

a. read-only memories or storages Mm utilized according to this invention for recording the instructions concerning the programme and sub-programmes of the application contemplated; therefore, these instructions may be modified only during breaks or hold-up times in the data processing system operation and consequently of the industrial plant or equipment controlled thereby; each read-only storage module, having a capacity of 2 kilo-octets, is embodied as a printed card carrying integrated circuits of the MOS type;

b. fast or live storages or memories Mv utilized according to the present invention notably for recording the parameters of the programs and sub-programs, which parameters are fed either before starting the data processing system or at various steps of the performance of the program contemplated, and also for registering intermediate processing results; before starting the data processing system, some of these fast storages Mv may also be utilized for assembling and developing the programs; each fast storage module comprises for example an integrated-circuit card of the MOS type having a capacity of 1 or 2 kilo-octets;

c. mixed storages or memories Mmv, of which each module comprises, on a same card carrying integrated circuits of the aforesaid type, for example a 256 octet fast storage and a 1792 octet read-only storage.

The slow peripheral units, shown as a whole at Pl, are connected to the bus line L not directly but via couplers, of which various types are contemplated, each type corresponding to a particular type of the slow peripheral units which are usually connected to the data processing systems contemplated for the above-mentioned applications, notably for controlling industrial processes.

There are provided notably:

a. couplers $Pl_1$ comprising 32 digital inputs and 32 digital outputs;

b. input couplers $Pl_2$ comprising only 64 digital inputs;

c. output couplers $Pl_3$ comprising only 64 digital outputs;

d. universal asynchronous couplers $Pl_4$ consistent with the asynchronous codes utilized for instance in teleprinters; such coupler comprises for instance one teleprinter access $t$ and one access $m$ for a modem (modulator-demodulator);

e. one or a plurality of special-purpose couplers, denoted $Pl_5$, notably an opto-electronic 32-input coupler, a 32-output relay coupler, and various power couplers adapted to be connected between, on the one hand, couplers having digital inputs and outputs, and, on the other hand, peripheral units such as tape readers and punchers, printers, etc.

A detailed description of the structure of each one of the aforesaid various types of couplers $Pl_1$ to $Pl_5$ is not deemed necessary, since the basic principle thereof is well known in the art; however, stress may be laid on the fact that the group of couplers suitable for the data processing system according to this invention is characterized, on the one hand, in that it is standardized, i.e. comprises a limited number of coupler types, having notably a well-defined number of inputs and outputs, and that, on the other hand, the inputs and/or outputs of each coupler of said group are designed for common operation, i.e. some of the inputs and outputs of a coupler may be utilized for connecting a peripheral unit of suitable type, whereas the other inputs and outputs of the same coupler are utilized simultaneously for connecting one or a plurality of other peripheral units of the same suitable type, without any risk of interfering or disturbing the processing of the inputs and outputs at the level of the coupler contemplated. To diagrammatize this specific and particularly advantageous feature of the coupler system equipping the data processing system according to this invention, in FIG. 1 the assembly of slow peripheral units Pl is shown in the form of a single black box in order to avoid suggesting that the various couplers $Pl_1$ to $Pl_5$ and the various slow peripheral units are connected bi-univocally to each other, that is, in the conventional manner. It is clear that the standardization of the various types of couplers and the common use of their inputs and outputs as contemplated in the data processing system according to this invention, impart a specific flexibility in the operation of this data processing system inasmuch as, for the applications contemplated, and notably for controlling industrial equipments and plants, the number of units and the number of the various types of peripheral units connected simultaneously to the data processing system will vary in most instances, not only from one industrial plant to another, but also according to the specific type of process to be controlled.

The program interrupting device In comprises a series of circuits carried by at least one card and embodying the means necessary for delivering to the processor Pr interrupt signals capable of producing eight graded or stepped levels of interruption of the program or sub-program in operation; however, devices of this kind were already known in data processing systems designed for real-time applications; therefore, their detailed description is not deemed necessary, inasmuch as the present invention is by no means restricted to any specific embodiment thereof. It is only necessary to point out that, when the processor Pr has completed the performance of the last instruction of the interrupt sub-program being performed, the same processor Pr will deliver a release signal to the interrupting device In, said processor Pr subsequently resuming the performance of the previously interrupted program or sub-program, exactly at the point where it was interrupted.

Figure 2:
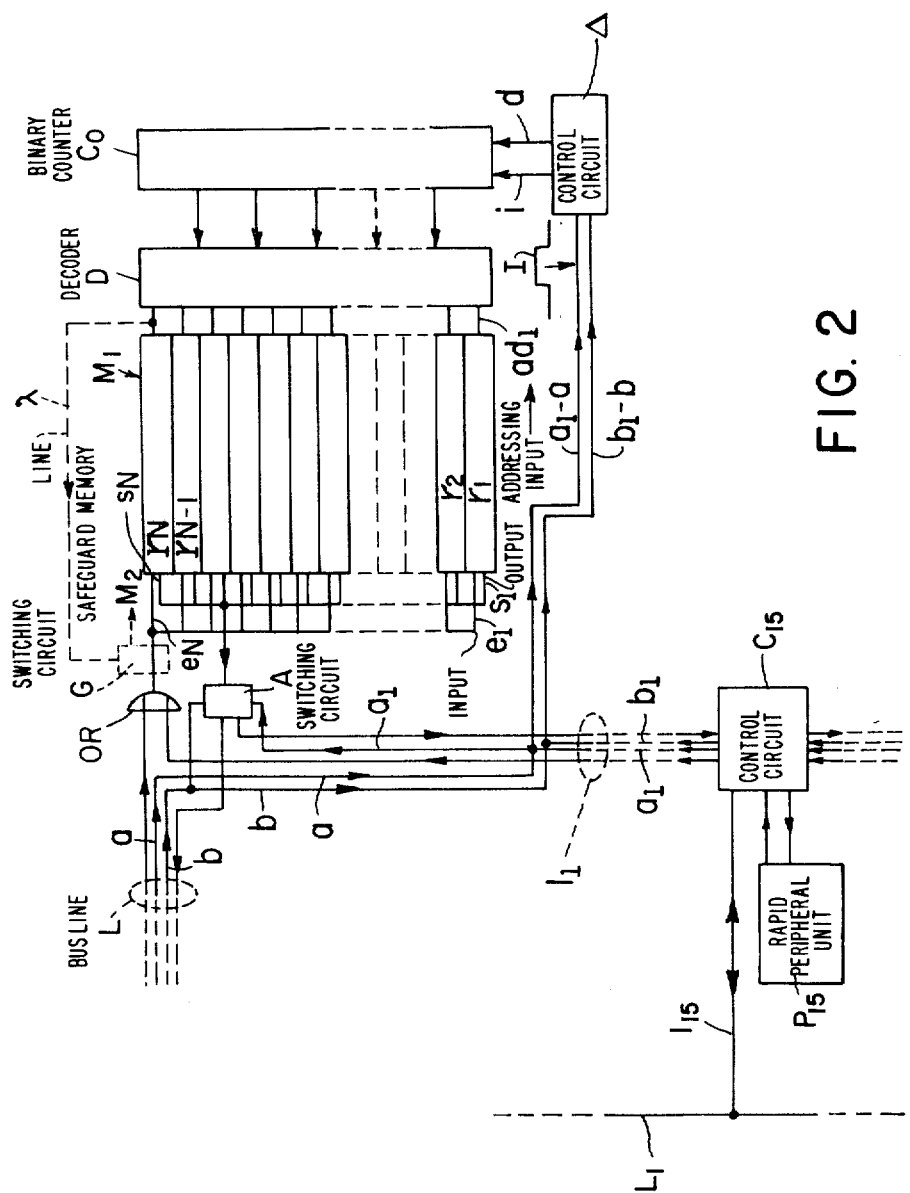
FIG. 2 is a more detailed block diagram illustrating a typical embodiment of one of the safeguard storages incorporated in the system of FIG. 1.

Each safeguard storage $M_1$ to $M_7$ is constructed as depicted in FIG. 2 in the case of storage $M_1$, according to this invention; thus, this safeguard memory or storage $M_1$ comprises essentially a number N of independent registers $r_1, r_2 \ldots r_N$, all identical with each other, and having notably the same capacity, for example 8 bits (one octet). These various registers $r_1$ to $r_N$ lend themselves to various embodiments, and may consist of magnetic cores; however, integrated registers of the MOS type are particularly well adapted for this specific application, due to their small dimensions (large-scale integration) and their very short access time.

The writing-in inputs such as $e_1$ of all the N registers are fed in parallel from the outputs of an OR-type logic circuit, of which a first set of inputs is connected to the wires of the bus line L which are intended for transferring information to the safeguard storage such as $M_1$, the second set of inputs of said OR-circuit being connected to the wires of a bus line providing a channel $l_1$ of which the function will be explained presently, said wires corresponding likewise to the transfer of information to the storage $M_1$. Similarly, the read-out outputs such as $s_1$ of all the registers $r_1$ to $r_N$ are connected in parallel to the inputs of a switching circuit A having a first and second set of outputs connected to the wires of bus lines L and $l_1$, respectively, provided for transferring information from storages such as $M_1$. The switching of information transmitted to the inputs of circuit A to its first or second set of outputs is controlled by information transmitted via wires $a$ and $a_1$, respectively, of bus lines L and $l_1$. The adressing inputs such as $ad_1$ of the various registers $r_1$ to $r_N$ are connected to the N outputs respectively of a decoder D having it inputs connected to the various stages of a binary counter $C_0$, respectively, having a capacity at least equal to N. The binary counter $C_0$ comprises an incremental input $i$ and a decremental input $d$, which are connected to corresponding outputs of a control circuit $\Delta$ having a function to be explained presently.

The data processing system illustrated in FIGS. 1 and 2 of the drawing and described hereinabove operates as follows:

When the processor Pr performs the program recorded in the storages Mm and receives at a given time, via a special wire of bus line L, a control signal for interrupting the program being performed, said interrupt signal being transmitted from the interrupting device In, the operation progress in said processor is interrupted, generally immediately, via blocking circuits of a known type, not described herein since they are conventional in the art; then, suitable and likewise circuit means of said processor deliver successively the momentary contents of all the registers $R_0$ to $R_6$ of processor Pr to the already mentioned transfer wires of bus line L which are connected to the first set of inputs of the OR-circuit of FIG. 2; stated more in detail, this transfer takes place as follows: assuming that each register $R_0$ to $R_6$ of processor Pr can store a predetermined number of octets, firstly the first octet contained in the first register $R_0$ is transmitted via the aforesaid transfer wires of bus line L and, at the same time, a special circuit of processor Pr delivers via a wire $b$ of bus line L, which is connected to a first control input of control circuit $\Delta$, a rectangular pulse I of which the front or leading edge precedes slightly the beginning of the transmission of the aforesaid octet, the rear or trailing edge of said pulse appearing slightly after the end of this transmission. The control circuit $\Delta$ is so constructed, in a manner known per se, that a pulse is transmitted to the incremental input $i$ of the binary counter $C_0$ when the leading edge of said rectangular pulse I appears on the wire $b$. Then, if before the transfer involved the storage $M_1$ is completely empty and the binary counter $C_0$ is also empty (i.e., with all the stages thereof in the zero condition), the leading edge of the first pulse I fed via wire $b$ from processor Pr causes a signal to be delivered via control circuit $\Delta$ to the incremental input $i$ of said counter $C_0$, the first stage of this counter $C_0$ subsequently passing to state 1, thus activating the first output of decoder D and consequently the addressing input $ad_1$ of the first register $r_1$ of storage $M_1$. Under these conditions, it is in this register $r_1$ that the first octet contained in register $R_0$ of processor Pr is subsequently transmitted, during the time of said rectangular pulse I, via the corresponding wires of bus line L, said OR-circuit and the writing-in input $e_1$ of said register $r_1$. The next rectangular pulse I delivered by processor Pr to wire $b$ causes the binary counter $C_0$ to make another increment, thus activating the second output of decoder D, which addresses the second register $r_2$ of storage $M_1$. Thus, the second octet contained in storage $R_0$ of processor Pr, or the first octet of its next register $R_1$, if register $R_0$ contained a single octet, is subsequently registered. In any case, when the first register $R_0$ of processor Pr has been discharged in the manner already described hereinabove, known automatic means (not described herein) will transfer immediately, without any gap, the content of the second register $R_1$ under the above-defined conditions, i.e. in such a manner that the first octet contained in said register $R_1$ be transferred to the register of storage $M_1$ having the next upper rank in comparison with the register having just registered the last octet contained in register $R_0$; this process will then continue automatically for registers $R_1$ to $R_6$ of processor Pr.

If the register $r_N$ of the safeguard storage $M_1$ is addressed by the last output of decoder D before the last register $R_6$ of processor Pr (or one of its preceding registers), has been emptied or discharged completely, a line $\lambda$ (in dash lines in FIG. 2) will transmit this addressing signal as a control signal to a switching circuit G (also shown in dash lines), whereby the inputs of said switching circuit G, which are connected to the outputs of the OR-circuit, instead of being connected to the writing-in inputs $e_1$ to $e_N$, of the N registers of storage $M_1$, as in the preceding case, are subsequently connected to the writing-in inputs of the N registers of safeguard storage $M_2$ (FIG. 1), so that the residual contents of the various registers of processor Pr, notably of its last register $R_6$, are still transferred to said storage $M_2$, of which the various registers $r_1$ to $r_N$ are themselves charged in succession, in their stacking order, as described in the foregoing with references to storage $M_1$. A plurality of other storages $M_3$ to $M_7$ may also be utilized for the same purpose.

It is pointed out that, with conventional mini-computers, in case a program is interrupted, the contents of the processor registers, which must definitively be safeguarded in anticipation of a subsequent resumption of the thus interrupted program, are preserved by transferring said contents to a live storage; moreover the addresses of the various areas of said live storage, to which the contents of the registers of said processor had been transferred, should be preserved in the processor proper to enable it to recover said information when resuming the interrupted program, so that some of the registers of said processor must remain occupied permanently by said addresses during the performance of the interruption sub-program. It will be readily understood that this last requirement is fully inconsistent with a substantial reduction in the number of registers of said processor with a view to reduce its cost and maintenance. In fact, if the processor of this mini-computer contained for instance only ten registers, the number of these registers which, during the performance of an interruption sub-program, would be occupied by the information addresses necessary for resuming the interrupted program, would be too small to ensure an efficient performance of said interruption sub-program. This limit to the possible reduction in the number of processor registers in a mini-computer is the more rapidly arrived at, as the number of graded or stepped interruption levels is larger; indeed, for instance when performing a sub-program of upper grade level after the preceding interruptions of the program and then of two sub-programs of lower grade levels, a substantial number of processor registers is necessary for preserving all the safeguard addresses of the register contents at the times of the program interrupt and of the two sub-program interrupts of lower grade levels. In lieu thereof, when the program in progress through the processor Pr of the date processing system according to this invention is interrupted, it is the contents of all the registers $R_0$ to $R_6$ that can be transferred to one or a plurality of safeguard storages $M_1 \ldots M_7$, without having to preserve corresponding addresses in some of said registers $R_0$ to $R_6$ for subsequently addressing said safeguard storages; in fact, the only address to be preserved after each transfer following a program interrupt is the serial number of upper-staged register of the safeguard storage to which the last octet contained in register $R_6$ was transferred, this obviously requiring a very moderate storage or memory capacity.

When the processor Pr of the data processing system according to this invention has completed an interruption sub-program and is authorized by the interrupting device In to resume the performance of the previously interrupted program or sub-program, at the very point it was interrupted, said processor Pr delivers via the wire $a$ of bus line L (also leading to a second input of control circuit $\Delta$), successive rectangular pulses I each adapted, on the one hand, throughout its duration, to switch the information available at the inputs of switching circuit A to its first output group, i.e., to the corresponding transfer wires of said bus line L, and on the other hand, when its rear or trailing edge appears, to cause the decremental input $d$ of binary counter $C_0$ to be activated. Thus the front or leading edge of the first one of said successive pulses I will not influence the content of the binary counter $C_0$, which, via decoder D, consequently still adresses the last, previously addressed register $r_p$; the content of this register $r_p$ is then transferred via its reading output $s_p$ to the last recording area of an octet in the last register $R_6$ of processor Pr, through the medium of the switching circuit A and of the transfer wires of bus line L connected to the first output group of said switching circuit A. When the last octet previously recorded in the safeguard storage $M_1$ has been transferred completely to said processor, the rear or trailing edge of pulse I causes the decremental input of counter $C_0$ to be activated, thus reducing by one unit the content of this counter; consequently, the register $r_{p-1}$ of said storage $M_1$ is addressed via said decoder D. When the next pulse I appears on wire $a$, the second word recorded in said register $r_{p-1}$ is transferred to processor Pr under the above-defined conditions, so as to re-record same in the penultimate recording area of an octet in the last register $R_6$.

The various octets previously "stacked" in the various registers of said safeguard storage $M_1$ are thus reintroduced one by one into the various registers $R_6$ to $R_0$ of processor Pr, actually, each at the point it occupied before the program or sub-program interrupt, which determined its transfer to a safeguard storage.

Of course, considering the specific embodiment discussed herein, for which up to seven graded interruption levels are contemplated, when performing a subprogramme of very high graded level, there may be up to seven different prior contents of the registers $R_0$ to $R_6$ of processor Pr, which are stacked in one or more safeguard storages or memories, the contents of said registers at the time of the last interrupt being recorded in the highest stages of the stack. However, whatever the number of successive interrupts, the resumption of the previously interrupted sub-programs and program is not subordinate to the use of addresses preserved in the meantime in one or several registers of said processor Pr since, for resuming the last program or sub-program thus interrupted, it is only necessary to recharge all the processor registers, having for instance a total capacity of $m$ octets, by using the contents of the $m$ highest stages of the safeguard storage, and to repeat this operation upon each new resumption of a previously interrupted program or sub-program by addressing each time another group of $m$ stages of said safeguard storage, located just beneath the one previously emptied for the preceding resumption of a sub-program.

The means necessary for carrying out these operations automatically in actual practice are not illustrated, and their detailed description is not deemed necessary, for they are within the knowledge of those skilled in the art.

In FIG. 1, there are also shown seven rows of rapid peripheral units denoted $P_{10} \ldots P_{19}, \ldots P_{70} \ldots P_{79}$, which are connected to the stacked registers, respectively, constituting the various safeguard storages $M_1$ to $M_7$, through the medium of bus lines $l_1$ to $l_7$ and control circuits $C_{10}$ to $C_{79}$, adapted in turn to exchange information with processor Pr via branchings $L_1$ to $L_7$ of bus line L; this shows that at least some of the safeguard storages according to the present invention can also be utilized under time-sharing conditions in channels for exchanging information between the data processing system according to the present invention and rapid peripheral units, as described in the aforementioned co-pending patent application. The corresponding means are illustrated in detail in FIG. 2, notably in the lower portion thereof, but their description is not deemed necessary in this Specification, since it can be found in said co-pending patent application. In the case of real-time applications as contemplated for the data processing system of this invention, this last-mentioned arrangement is characterized by the important advantage that the processor can be relieved nearly completely from the processing of inputs and outputs of said rapid peripheral unit, so that the processing or operating capability of the data processing system can be reduced considerably while adapting said capability exactly to the requirements consistent with the specific real-time application for which it is intended.

On the other hand, at least some of the safeguard memories or storages $M_1$ to $M_7$ of the data processing system according to this invention may also be used under time-sharing conditions as temporary storages for keeping intermediate process results, parameters of sub-programs, and the like, which have access to said storages via said bus line L and OR-circuit or switching circuit A (FIG. 2).

These two last-mentioned arrangements, although advantageous in that they increase strongly the rate of utilization of the safeguard storages and reduce consequently the incidence of their cost, imply however a certain processing of the addresses of the various registers of said safeguard storages, inasmuch as the contents of said registers is no more homogeneous; nevertheless, this addresse processing remains extremely simple, since a single address, notably the highest number of the stages occupied thereby, is sufficient for a same information block whether it corresponds to a specific version of the contents of registers $R_0$ to $R_6$ of processor Pr, to a block of words from a rapid peripheral unit, or to an intermediate process result transmitted from said processor.

Anybody skilled in the art of data processing systems will readily understand that the above description refers essentially to basic principles of the invention, and that various embodiments thereof may be imagined without departing from the scope of this invention as set forth in the appended claims.

What is claimed as new is:

1. Data processing system, particularly for real-time applications requiring a relatively moderate processing capability, which comprises:
    a. a processor comprising:
        i. a plurality of registers,
        j. means for interrupting a processing program or subprogram,
        k. means for performing said processing program or subprogram, and for performing at least one subprogram necessary for a real-time application upon the occurrence of an interruption caused by said interrupting means, and subsequently, upon completion of said subprogram necessary for a real-time application, for resuming the performance of the previously interrupted program or subprogram,
    b. a plurality of safeguard storages consisting each of a stack of N independent and sequentially addressable registers,
    c. means for controlling a transfer of the contents of all the registers of said processor to at least one of said safeguard storages in a predetermined sequential order when a program or subprogram is interrupted and for re-loading the registers of said processor with said contents previously transferred to at least one of said safeguard storages in a sequential order reverse with respect to said predetermined order when resuming said interrupted program or subprogram,
    d. and at least one bus line connecting said registers of said processor to said safeguard storages for transferring said contents, and said interrupting means to said performing means for transmitting an interrupt signal from said interrupting means to said performing means.

2. Data processing system as set forth in claim 1, further comprising a plurality of rapid peripheral units connected to the same said bus line, and channels connected to said rapid peripheral units and to said processor through said bus line for exchanging information between said processor and said rapid peripheral units, at least some of said safeguard storages being inserted in said information exchange channels and connected to said processor through said bus line and to said rapid peripheral units for operation as buffer storages under time-sharing conditions.

3. Data processing system as set forth in claim 1, further comprising safeguard storages connected to said processor through said bus line for temporarily storing, in at least some of these safeguard storages, immediate results and subprogram parameters in said predetermined sequential order and between two selected steps of said program or of one of said subprograms.

4. Data processing system as set forth in claim 1, further comprising read-only storages connected to said bus line for recording the instructions of said program and subprograms, and live storages connected to said bus line for recording parameters of said program and subprograms.

5. Data processing system as set forth in claim 1, further comprising slow peripheral units having arbitrary numbers of inputs and outputs, and standardized couplers having all same predetermined numbers of inputs and outputs, each of said coupler inputs and outputs being adapted to be used for coupling any one of said slow peripheral units to said bus line.

6. Data processing system as set forth in claim 1, wherein said bus line comprises a plurality of conductors and a plurality of identical connectors for connecting storages and peripheral units to said bus line, each conductor of said bus line extending to each one of said connectors.

* * * * *